United States Patent [19]

Christoffel, Jr.

[11] 4,277,040
[45] Jul. 7, 1981

[54] KITE STRUT CONNECTOR

[75] Inventor: Julius M. Christoffel, Jr., Decatur, Ill.

[73] Assignee: Damon Corporation, Needham Heights, Mass.

[21] Appl. No.: 920,679

[22] Filed: Jul. 14, 1978

[51] Int. Cl.³ .................. B64C 31/06; A63H 27/08
[52] U.S. Cl. .................. 244/153 R; D21/88; D21/91; D8/382; 403/234; 403/406; 403/176
[58] Field of Search .................. 244/153 R, 155 A; 403/234, 406, 309, 313, 169–176, 178, 407; D21/88, 91; D8/382

[56] References Cited

U.S. PATENT DOCUMENTS

| 919,436 | 4/1909 | Jackson | 244/153 R |
|---|---|---|---|
| 2,500,636 | 3/1950 | Isakson | 403/406 |
| 2,785,870 | 3/1957 | Green | 244/153 R |
| 3,248,075 | 4/1966 | Cunningham | 244/153 R |
| 3,347,500 | 10/1967 | Hartig | 244/153 R |
| 3,534,932 | 10/1970 | Christoffel et al. | 244/153 R |
| 3,570,790 | 3/1971 | Christoffel | 244/153 R |
| 3,570,792 | 3/1971 | Christoffel | 244/153 R |
| 4,049,127 | 9/1977 | Alexander | 403/234 |
| 4,133,500 | 1/1979 | Chapman | 244/153 R |

FOREIGN PATENT DOCUMENTS 1515984  6/1978  United Kingdom ............ 244/153 R

Primary Examiner—Galen L. Barefoot
Attorney, Agent, or Firm—Kenway & Jenney

[57] ABSTRACT

In a collapsible kite structure, a snap lock connecting assembly comprising at least two suitably rigid sticks or struts and at least one detachable bracing stick or strut, in combination with a snap lock connecting unit. The snap lock includes a fastening body portion attached to a stiffening stick, such as a wing stick of said kite, and a resilient, flexible, hollow retainer body portion configured to securely receive and resiliently hold an end part of a bracing strut. The retainer body portion of the snap lock has a longitudinal slot through the side thereof for forced passage therethrough of an end part of the bracing stick whereby the end of the bracing strut may be detachably retained in a secure position within said hollow retainer body. In a preferred embodiment the retainer body portion of the snap lock has a bead or other interengaging structure to enhance the secure retention of the end of the detachable bracing stick within the retainer body.

2 Claims, 7 Drawing Figures

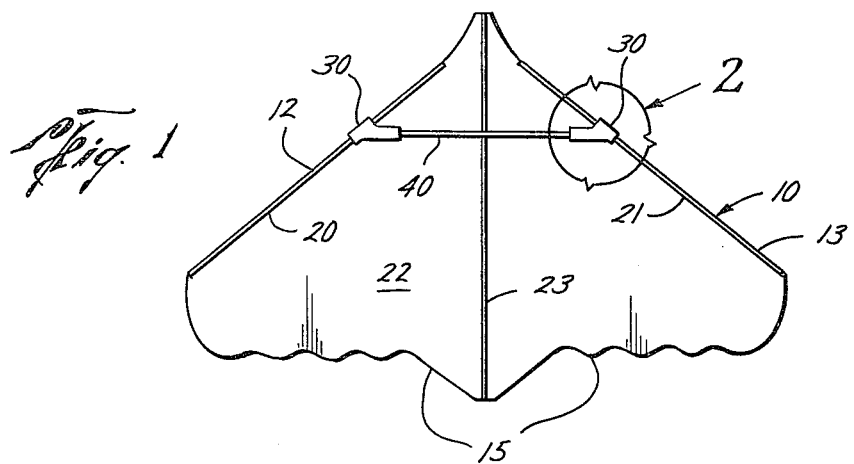
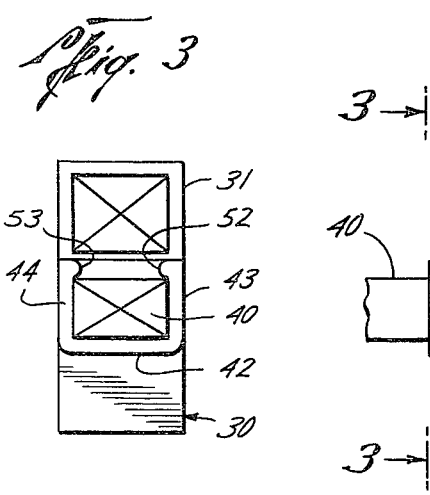
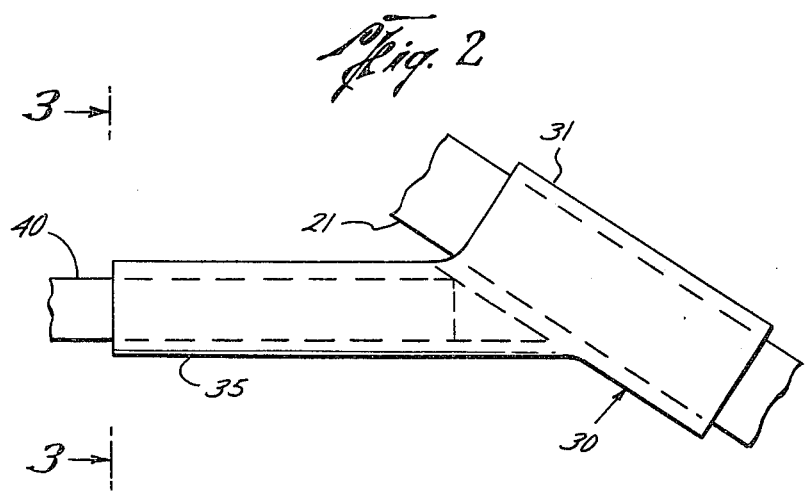
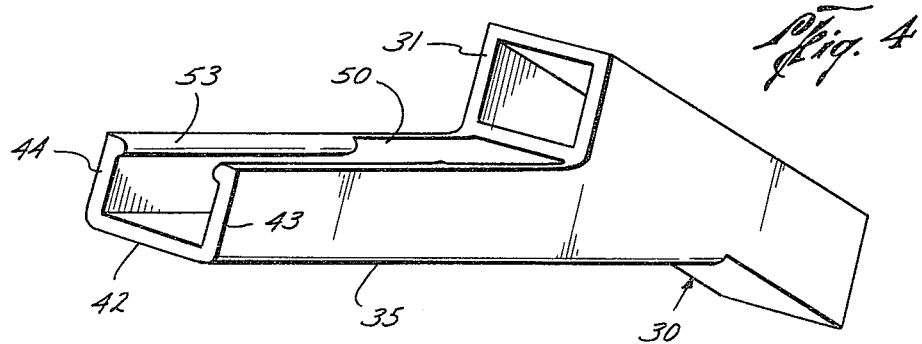

KITE STRUT CONNECTOR

BACKGROUND OF THE INVENTION

In the art of manufacturing collapsible kites, various kite structures and configurations which are adapted to be folded or rolled for storage or shipment. Such kites usually have at least one detachable stick or strut to provide a brace between stiffening members to the kite body, and means for attaching or securing the bracing stick between the rigid sticks or struts. In U.S. Pat. No. 3,347,500, which issued to Hartig, a number of means of securing a detachable bracing strut are shown, such as a string, cord or the like passing through an aperture adjacent the end portion of the bracing stick, pockets provided to receive an end of the bracing strut, or a length of flexible tubing secured to the flat material of the kite body and passing over the end of the bracing strut.

The art has generally favored various forms of pockets for detachably securing the bracing strut or cross stick member to facilitate assembly by the purchaser. It is recognized that these kites are frequently assembled by young children, and kites having flexible tubing, strings or the like as attaching means have not had general acceptance because they are difficult to assemble.

On the other hand, the various brackets of the prior art which provides pockets to receive the end of a bracing strut require that the bracing strut be longitudinally arched so that the end can be inserted into the pocket. When the kite is assembled the effort to force the strut into the pocket may result in tearing of the thin sheet material of the kite body, breaking the strut, or breaking the retaining bracket. Moreover, an open pocket does not provide lateral support for the bracing strut whereby stresses on the strut are concentrated on the ends thereof. The cross strut or stick is an integral part to the entire kite structure and is subjected to varying forces tending to compress or flex the strut when the kite is flown. Such forces may be especially severe when the kite is flown in gusty winds. When the bracing strut is retained in a pocket, such stresses and forces tend to wear and break the end of the strut as well as the bottom of the pocket resulting in loosening or breaking of the cross strut.

SUMMARY OF THE INVENTION

The present invention relates to an improved kite structure providing means for convenient assembly by the purchaser and providing improved structural integrity of the assembled kite.

One object of the present invention is to provide a kite structure which may be assembled without substantial bending or bowing of the detachable bracing strut.

Another object is to provide an improved kite structure having a resilient holding means for the ends of a detachable bracing strut to provide improved stability for the assembled kite.

A further object is to provide an improved kite structure adpated for easy assembly with minimal risk of damage to the kite structure in the process of installing the detachable bracing strut.

Additional objects and advantages of the invention will be apparent from the disclosure, claims and drawings which follow.

BRIEF DESCRIPTION OF THE DRAWINGS

In the accompanying drawings,

FIG. 1 is a top plan view of an improved kite constructed in accordance with the present invention.

FIG. 2 is an enlarged side view of the snap lock of the present invention. FIG. 3 is a sectional view of the snap lock of the present invention taken along lines 3—3 in FIG. 2.

FIG. 4 is a perspective view of the snap lock of FIGS. 3 and 4.

DESCRIPTION OF THE PREFERRED EMBODIMENTS

Figure 6:
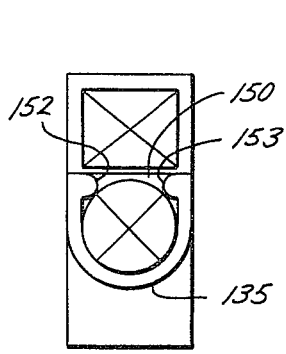
FIG. 6 is a cross sectional view of the retainer means of FIG. 5 taken along lines 6—6.

Kites embodying the present invention may be constructed with various configurations such as a substantially triangular or delta configuration in which the apex of the triangular shape is at the front of the kite, the sides of the kite are defined by rearwardly diverging edges 12 and 13 and the back edge 15 of the kite may be variously scalloped or configured but, in the presently preferred delta configuration, it will roughly define the base of the triangle.

In this illustrated embodiment of the invention, as well as in other embodiments of collapsible kites to which the invention pertains, the kite is given structural stability by means of at least one detachable bracing strut and conventional stiffening support struts of wood, plastic, or the like. Such bracing strut and stiffening struts serve as structural members providing sufficient rigidity to maintain the shape of the assembled kite.

In FIG. 1, wing struts 20 and 21 are affixed to the flat, thin sheet material or the kite body 22 by suitable means such as adhesives, staples, or the like. Likewise a stiffening keel strut 23 may be suitably affixed to the sheet material 22 in a longitudinally aligned position in the center of the kite to provide additional structural stability.

An embodiment of the snap lock 30 of the present invention is shown in FIGS. 2-4. In this embodiment a portion of the snap lock comprises a fastening body 31 having a central opening through which wing strut 21 is inserted. The fastening body portion of the snap lock is suitably positioned on the wing strut so that it will be generally in the forward section of the assembled kite as shown in FIG. 1 in accordance with principals of kite design which are well known in the art. When placed in the desired position on the wing strut, the fastening body is securely affixed to the wing strut by suitable means such as brads, nails, screws, staples, glue or other adhesives known in the art.

The retainer body 35 of the snap lock 30 is preferably made integral with the fastening body. It extends laterally in a inward direction with respect to the assembled kite and is aligned to receive in the hollow portion of retainer body 35 a detachable bracing strut such as the cross strut 40.

The retainer body is constructed of resilient flexible material whereby cross strut 40 is securely held in close fit against walls 42, 43 and 44. In the slotted opening 50, beads 52 and 53 extend along a substantial portion of the edges of slot 50 to provide interengaging means to maintain the cross strut 40 securely within the hollow portion of retaining body 35. The width of the slot is also smaller than the largest cross section dimension of the end portion of the bracing strut so that the end portion of the bracing strut may be forced through the slot and securely held by the resilient body of the retainer portion of the snap lock.

Figure 5:
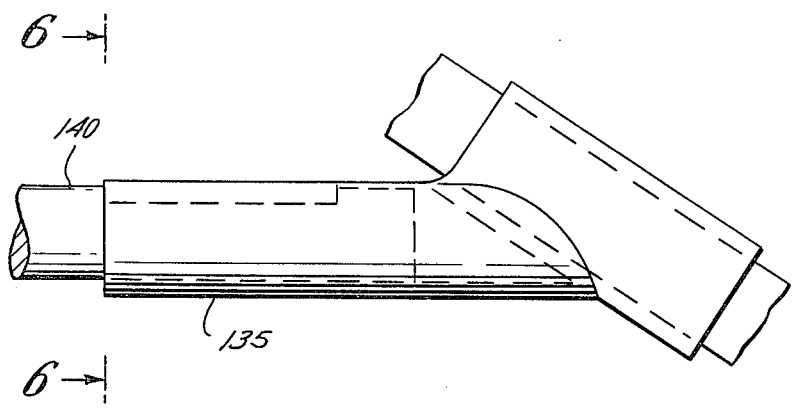
FIG. 5 is an enlargement of an alternate embodiment of the snap lock of the present invention illustrating the use of a bracing strut having a circular cross section.

In FIGS. 5 and 6 an embodiment of the snap lock of the present invention is shown in which the retainer body 135 has an interior hollow portion configured to snugly receive a cross strut 140 having a substantially circular cross section. In this embodiment slot 150 is provided for passage therethrough of the end of cross strut 140 into its seated position within the retainer body and shoulders or beads 152 and 153 are provided along the edges of slot 150 as interengaging means to securely retain an end part of strut 140 within the retainer body.

Figure 7:
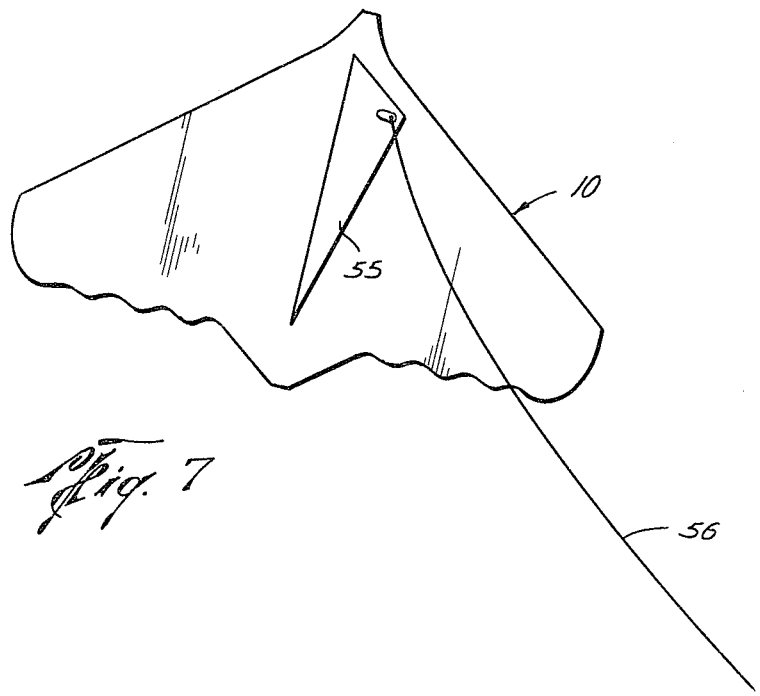
FIG. 7 is a perspective view of the kite of the present invention during flight.

In FIG. 7, the embodiment of kite 10 is shown in flight, illustrating a typical assembly of kite 10 showing the keel 55 and string 56.

The snap lock of the present invention may be suitably cast or molded from metal, hard rubber or various plastics, such as high density polyethylene, nylon, or synthetic rubbers, and the like. The material used must have suitable resilience and flexibility. Molded high density polyethlene is presently preferred for this purpose.

Advantages of the present design in addition to increased kite stability in flight and durability of the connecting assembly include a reduction in the amount of material required to manufacture the connector compared with prior bracket designs and increased lateral security of the bracing strut, such as cross strut 40 or 140 as a result of the gripping action of the snap lock. The improved structual integrity of the kite results in an improved kite with respect to improved performance and increased capacity for use.

Although a specific embodiment of the invention has been illustrated in the drawings and described in the foregoing specification, the snap lock connecting unit of the present invention is applicable to various kite structures. Moreover, a snap lock connection unit may be used in the construction of collapsible kites in combination with structures of the prior art. For example, many of the benefits of the present invention may be achieved in the construction of a kite having a detachable bracing stick or strut member with one end of the stick attached by means known in the prior art, for example, rubber tubing and the other end secured by the snap lock unit of the present invention.

I claim:

1. In a collapsible kite structure having a front end, at least two stiffening support struts secured to a body of flat material and at least one bracing strut detachably secured to the stiffening struts, the improvement comprising a snap lock including a fastening body affixed to one stiffening strut and a resilient hollow retainer body extending laterally from said fastening body with the hollow opening therein fixedly aligned to receive an end part of the detachable strut, wherein said retainer body includes a slot through the side thereof and facing the front end of said kite and extending longitudinal to the extension of the retainer body for the passage therethrough of an end part of the detachable strut, and wherein the interior of said retainer body is configured to removably and replaceably receive and to snugly and resiliently hold said end part of the detachable strut, and further including resilient interengaging means adjacent the hollow portion of said retainer body and adjacent said slot for resiliently engaging the end portion of the detachable strut within said hollow retainer body, said interengaging means comprising a longitudinal bead along at least a part of the inner edge of at least one side of said slot.

2. In a collapsible kite structure according to claim 1, the improvement further including a pair of said interengaging beads, each longitudinally disposed along the inner edge of one side of said slot.

* * * * *

UNITED STATES PATENT AND TRADEMARK OFFICE
CERTIFICATE OF CORRECTION

PATENT NO. : 4,277,040

DATED : July 7, 1981

INVENTOR(S) : Julius M. Christoffel, Jr.

It is certified that error appears in the above-identified patent and that said Letters Patent are hereby corrected as shown below:

Column 1, line 9, insert --secured-- after "members"

Column 3, line 27, change "polyethlene" to --polyethylene--

Signed and Sealed this

First Day of June 1982

[SEAL]

Attest:

GERALD J. MOSSINGHOFF

Attesting Officer    Commissioner of Patents and Trademarks